Sept. 15, 1953 M. J. LUSH 2,652,533
GAUSSMETER
Filed Nov. 24, 1950 3 Sheets-Sheet 1
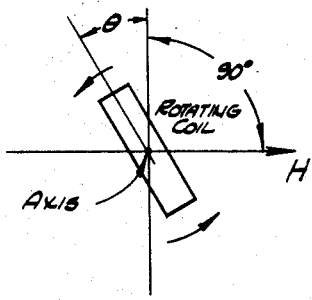
FIG. I
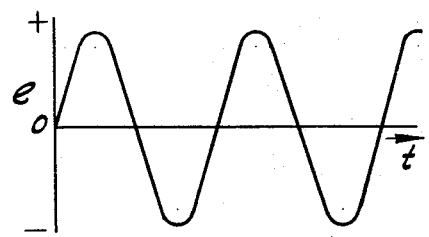
FIG. II
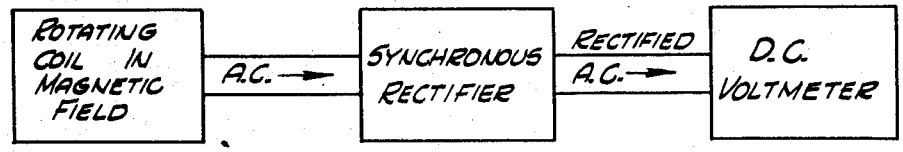
FIG. III
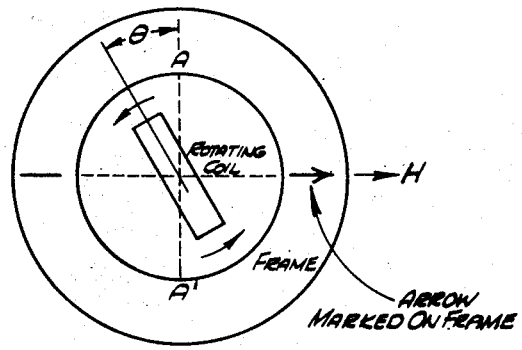
FIG. IV
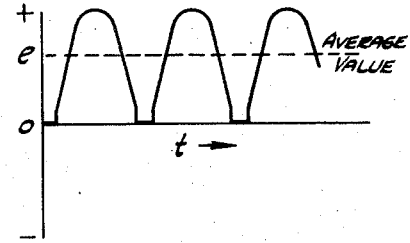
FIG. V
INVENTOR.
Morley J. Lush Sept. 15, 1953  M. J. LUSH  2,652,533
GAUSSMETER
Filed Nov. 24, 1950  3 Sheets-Sheet 2
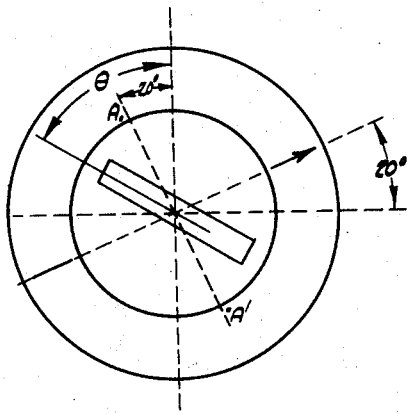
Fig. VI
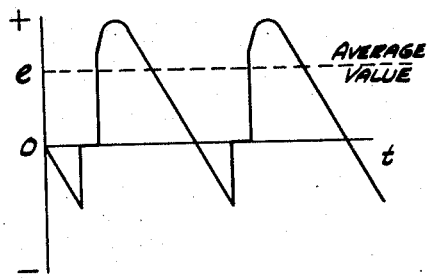
Fig. VII
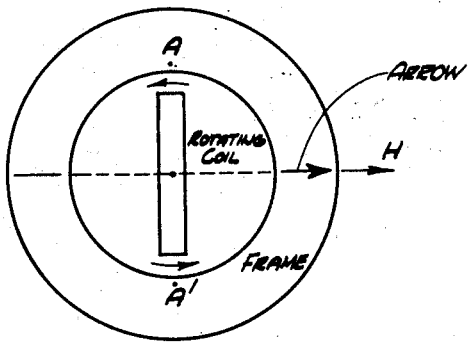
Fig. VIII
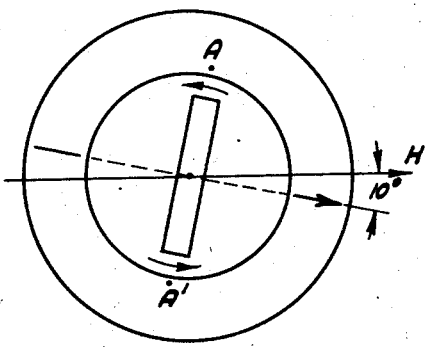
Fig. IX
INVENTOR.
Morley J. Lush

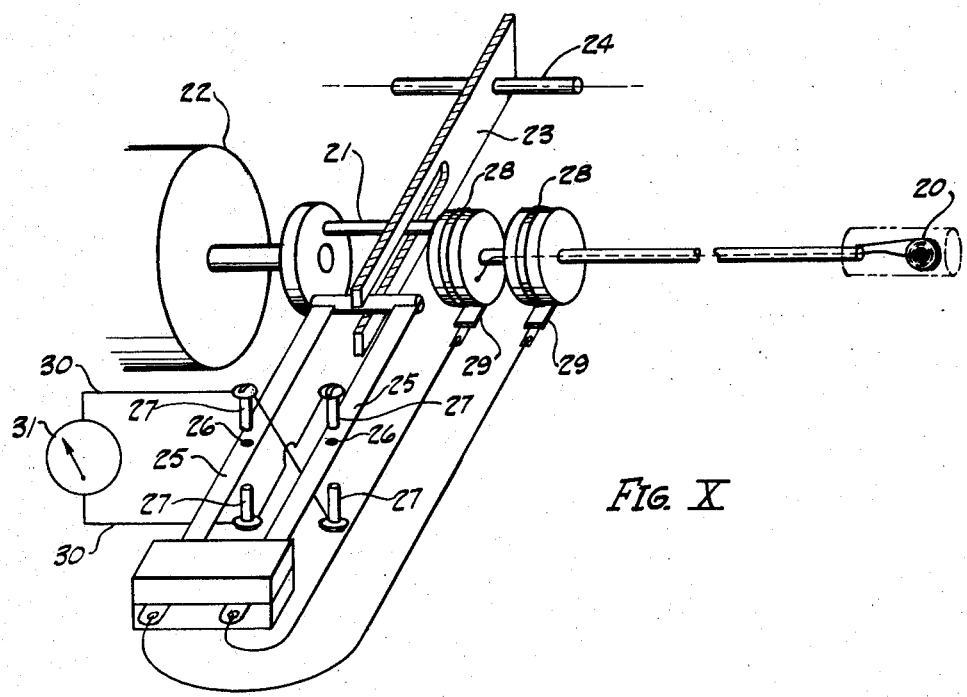
FIG. X
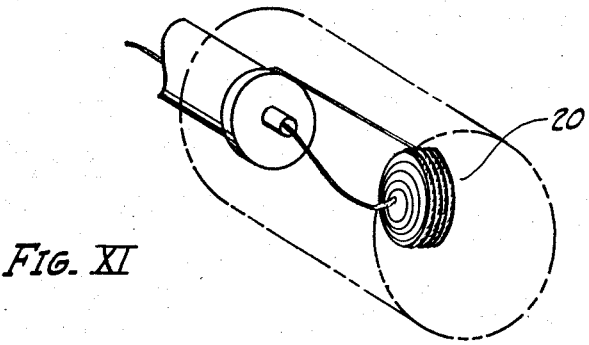
FIG. XI
INVENTOR.
Morley J. Lush

Patented Sept. 15, 1953

2,652,533

UNITED STATES PATENT OFFICE 2,652,533

GAUSSMETER

Morley J. Lush, Cambridge, Mass., assignor to Rawson Electrical Instrument Company, Cambridge, Mass.

Application November 24, 1950, Serial No. 197,219

3 Claims. (Cl. 324—47)

This invention relates to instruments for measuring magnetic fields, and has particular reference to instruments of this type which use a rotating coil in the magnetic field as a sensing or pickup device.

It is an object of this invention to provide a new and improved gaussmeter.

Referring to the drawings:

Figure I indicates the rotation of a coil in a magnetic field;

Figure II shows the type of alternating current curve obtained from the rotation of a coil in a magnetic field as in Figure I;

Figure III is a block diagram generally showing the components of a gaussmeter embodying this invention;

Figure IV illustrates a magnetic field direction indicating arrow on the assembly with the coil rotating in a magnetic field;

Figure V indicates the wave form obtained under the conditions indicated in Figure IV;

Figure VI is an illustration like that of Figure IV, with the arrow at a different rotary angle;

Figure VII indicates the wave form obtained under the conditions indicated in Figure VI;

Figure VIII is a further illustration of the use of a magnetic field direction indicating arrow;

Figure IX is an illustration like that of Figure VIII, with the device measuring a component ten degrees off the magnetic field direction;

Figure X is an illustration of an assembly of this invention with a mechanical rectifier; and Figure XI is an enlarged showing of the rotatable coil of Figure X.

This invention is concerned with an instrument for measuring the intensity and direction of magnetic fields in air. This measurement is of considerable importance as an aid in the design of all sizes of electromagnets and permanent magnets. The instrument of this invention uses a small coil of wire rotating at constant and known speed in the magnetic field to be measured. The voltage generated in the coil due to its motion in the field is represented by the formula $$e = KH \sin (2\pi ft)$$

where $e$ is the instantaneous value of the voltage, $H$ is the value of the magnetic field perpendicular to the axis of rotation of the coil, $K$ is a constant which depends on the dimension of the coil, $f$ is the speed, or frequency of rotation of the coil, and $t$ is the time, measured from one of the instants when, referring to Figure I, the angle $\theta$ is zero.

Figure II shows voltage plotted with respect to time, as developed by the coil rotation as in Figure I. The voltage is alternating in polarity and has an amplitude proportional to the value of the magnetic field $H$, perpendicular to the axis of rotation of the coil.

It has long been known that a rotating coil in a magnetic field, with means provided to collect and measure the alternating voltage thus produced in the coil, would constitute an instrument for measuring magnetic fields. Previous instruments using this general arrangement have not been commercially successful. Coils of sufficiently small size to be inserted in the air gap of ordinary magnetic circuits will not develop sufficient voltage to operate ordinary alternating current instruments, such as thermal, electrodynamometer, moving iron vane, or electrostatic types. Another disadvantage of such prior art devices is that the direction of the magnetic field is not determinable unless a phase measuring device is used.

This invention is shown in block diagram form in Figure III. It eliminates the above objections to previous instruments, and makes possible, for the first time, a practical, convenient instrument for measuring both the magnitude and direction of magnetic fields in small spaces. It will be shown later herein that this instrument will also indicate the component of a magnetic field in any desired direction perpendicular to the axis of rotation of the instrument coil.

The use of a D. C. voltmeter in place of the previously used A. C. voltmeters results in an enormous increase in sensitivity, because regular D. C. meters of the D'Arsonval type can be a thousand or more times as sensitive to small voltages as ordinary A. C. meters of the same size and price range.

The function of the "synchronous rectifier" in Figure III is to change the alternating voltage from the rotating coil to a pulsating, single polarity voltage. This synchronous rectifier may take either of two forms to be indicated later herein, each of which constitutes a set of electrical contacts arranged as a polarity reversing switch coupled either mechanically or electrically to the rotating coil so that the reversings of polarity will always take place at two definite points in the rotation, at an angular distance of 180 degrees apart.

Figure IV illustrates the use of the instrument to measure the intensity of a magnetic field in the direction of maximum intensity. The instrument, comprising the rotating coil, a driving motor, and the synchronous rectifier, is constructed on a framework, which may well be a protective case to cover all moving parts. The D. C. indicating meter may be included in the assembly or set up separately, with connecting leads. Whenever the rotating coil passes the points A and A', Figure IV, on the frame, which occurs when the angle $\theta$ passes through 0°, 180°, 360°, 540°, etc., the synchronous rectifier operates to reverse the polarity of its output connections. The resulting output voltage waveform is shown in Figure V. There are small breaks at the transition from one half cycle to the next, due to the necessity for a finite transition time from one polarity to the other in the switch contacts. When the voltage pattern of Figure V is impressed upon a D. C. voltmeter, the voltage is mechanically integrated and the average value shown by the dotted line in Figure V is indicated on the voltmeter.

When the coil is revolved at known and constant speed, the scale on the D. C. voltmeter can be calibrated to read directly in magnetic field strength units, i. e., gausses, kilogausses, or other suitable measurement units. The most common method of obtaining known and constant speed of rotation is to drive the coil by means of a synchronous motor connected to an A. C. electrical power source of fixed, known frequency.

In order to obtain the voltage waveform shown in Figure V, it is necessary that the magnetic field be in the direction shown by the arrow H in Figure IV. The switch transitions occur at the instant when the voltage, as in Figure II, goes through zero, so that all the wave form amplitudes are on the positive side of the zero line. An arrow is marked on the frame of the instrument, and when the waveform of Figure V is produced, the arrow on the frame indicates the direction of the magnetic field. By bodily rotating the whole instrument about the axis of rotation of the coil, the instrument can be used to indicate the component of the magnetic field in any desired direction. Figure VI indicates the situation when the whole instrument is rotated to an angle of twenty degrees from its previous position, Figure V. The waveform of the output voltage thus obtained is shown in Figure VIII.

With this arrangement, the switch transitions no longer occur at the instants when the voltage is zero. The waveform now has negative portions and therefore the average value is decreased.

An analysis shows that the D. C. meter reading may now be expressed in the formula $$E_{20°} = E_{0°} \cos 20°$$

$E_{20°}$ is the average value of output voltage when the whole instrument is rotated until there is an angle of twenty degrees between the arrow on the frame and the direction of the magnetic field. $E_{0°}$ is the average value of output voltage when the arrow on the frame points in the direction of the magnetic field. Further rotation of the whole instrument will cause additional drops in the average value until the angle between the arrow on the frame and the magnetic field direction is 90°, at which time the meter reading will be zero. At all points of rotation of the whole instrument, the D. C. meter reading is proportional to the value of the field in the maximum direction, multiplied by the cosine of the angle between the arrow and the magnetic field maximum direction. This is exactly the same as the component of the field in the direction of the arrow on the frame at the various rotary positions of the instrument. In all cases the axis of rotation is perpendicular to the direction of the magnetic field.

The arrangement of the arrow on the frame and the bodily rotation of the whole instrument provide the very desirable function of separately measuring the directional components of a magnetic field. Referring to the coupling between the rectifying mechanism and the rotating coil, the switching points will always occur when the coil is at definite rotary angles with respect to the frame and, therefore, with respect to the arrow on the frame.

In Figures VIII and IX, switching occurs at the instant when the rotating coil passes points A and A'. The arrow on the frame is drawn or scribed at right angles to the axis of rotation and at right angles to the plane of the coil at the instants of switching. If the coil is rotating in a magnetic field, with the field having a direction identical to that of the arrow, the indicating meter will give a deflection accurately proportional to the intensity of the magnetic field.

If the entire instrument is bodily rotated about the rotating axis of the coil to the position shown in Figure IX, the meter reading will drop by a factor of cosine of ten degrees. Further rotation will cause additional drop in the meter reading until the angle between the field H and the arrow on the frame is ninety degrees, at which point the reading is zero.

The meter reading at all points of bodily rotation of the whole instrument is accurately proportional to the value of the magnetic field H, multiplied by the cosine of the angle between H and the arrow on the frame. This is exactly the value of the component of H in the direction indicated by the arrow on the frame at each of the points of bodily rotation of the instrument. This provides the desirable function of separately measuring the directional components of the magnetic field.

In illustration of an embodiment of this invention, Figure X shows a cam driven vibrator construction. Coil 20 and cam 21 are both rotated by a motor 22, in such manner that the angular relation between the coil and the cam cannot change during the rotation. A rocker arm 23 oscillates about a fixed shaft 24 as a pivot, and causes contact arms 25 to vibrate. Moving contacts 26 are driven back and forth between fixed contacts 27. The contact arms 25 are made flexible to allow overtravel and keep the contacts closed as long as possible in either direction with only a short transition time.

The alternating voltage from coil 20 is collected from rings 28 by brushes 29. The connections shown in Figure X accomplish the desired reversals of polarity in output connection wires 30 to the D. C. meter 31. These reversals are in exact synchronism with the rotation of the coil 20. Figure X shows the essential features of the mechanism except for the protecting case, or frame, with the arrow thereon, to give the direction of the field being measured. The exact arrangement of the frame and the arrow is dictated by convenience and the desired rotary location of the break and make points of the rectifier.

I claim:

1. A gaussmeter comprising a rotatable shaft, an electrical circuit including a coil of wire mounted on said shaft for rotation therewith whereby rotation of said coil in a magnetic field produces an alternating current in said coil and circuit, a cam and rigid rocker arm rectifier for mechanically rectifying said alternating current by breaking and making said circuit at regular points in each single revolution of said coil, said rectifier being activated by the rotation of said shaft, and said rectifier being bodily adjustable in rotation about the axis of said shaft, whereby the angular positions of rotation of said coil at the time of said circuit breaks and makes may be varied, and a D. C. meter operable from the output of said rectifier.

2. A gaussmeter assembly comprising a comparatively long and small diameter rotatable shaft, a motor for rotating said shaft, a small coil of fine wire mounted on the outer end of said shaft with circuit connections along said shaft from said coil whereby rotation of said coil in a magnetic field produces an alternating current in said coil and circuit connections, a cam and rigid rocker arm rectifier unit mechanically associated with said shaft for activation thereby and electrically connected with said circuit connections, for mechanically rectifying said alternating current by breaking and making said circuit connections at regular points in each single revolution of said coil, said rectifier unit comprising a cam arrangement on said shaft and a switch unit operable by said cam arrangement, said assembly being bodily adjustable in rotation about the axis of said shaft, whereby the angular positions of rotation of said coil at the time of said circuit breaks may be varied, and a magnetic field direction indicating arrow on said assembly.

3. For use in a device for measuring magnetic fields, a gaussmeter assembly comprising a small, elongated, rotatable shaft, a coil of wire mounted on one end of said shaft for rotation therewith, means at the other end of said shaft for rotating said shaft with said coil in a magnetic field to produce an alternating current in said coil, a pair of collector rings on said shaft adjacent said rotating means with said wire coil having an end connected to each of said rings, take-off brushes engaging said collector rings, a cam on said shaft adjacent said collector rings and rotatable therewith, and a rectifier switch arrangement including flexible electric contact arms connected to said take-off brushes and a rigid rocker arm operatively engaging said cam and movable thereby to engage said flexible contact arms as a means of operating said switch arrangement.

MORLEY J. LUSH.

References Cited in the file of this patent

UNITED STATES PATENTS

| Number | Name | Date |
|---|---|---|
| 1,047,157 | Bliss | Dec. 17, 1912 |
| 1,863,421 | Tear | June 14, 1932 |
| 1,988,521 | Sperry et al. | Jan. 22, 1935 |
| 2,460,999 | Nilson et al. | Feb. 8, 1949 |